United States Patent
Hiroi et al.

(10) Patent No.: US 8,258,242 B2
(45) Date of Patent: Sep. 4, 2012

(54) COMPATIBILIZING AGENT FOR POLYMER ALLOY, POLYMER ALLOY, AND MASTER BATCH FOR PREPARATION OF POLYMER ALLOY

(75) Inventors: Ryoichi Hiroi, Tokushima (JP); Minoru Yamamoto, Tokushima (JP)

(73) Assignee: Otsuka Chemical Co., Ltd., Osaka (JP)

( * ) Notice: Subject to any disclaimer, the term of this patent is extended or adjusted under 35 U.S.C. 154(b) by 407 days.

(21) Appl. No.: 12/310,314

(22) PCT Filed: Aug. 16, 2007

(86) PCT No.: PCT/JP2007/065942
§ 371 (c)(1),
(2), (4) Date: Feb. 20, 2009

(87) PCT Pub. No.: WO2008/023625
PCT Pub. Date: Feb. 28, 2008

(65) Prior Publication Data
US 2009/0326153 A1    Dec. 31, 2009

(30) Foreign Application Priority Data
Aug. 21, 2006 (JP) ................................. 2006-224147

(51) Int. Cl.
*C08G 65/321* (2006.01)
(52) U.S. Cl. ........................................................ 525/413
(58) Field of Classification Search .................... 525/413
See application file for complete search history.

(56) References Cited

U.S. PATENT DOCUMENTS

| 6,900,272 B2 * | 5/2005 | Matsuoka et al. | 525/189 |
| 2004/0234447 A1 | 11/2004 | Inubushi et al. | 423/598 |
| 2005/0131121 A1 | 6/2005 | Tsutsumi et al. | 524/413 |
| 2006/0097230 A1 | 5/2006 | Hareyama et al. | 252/500 |
| 2007/0066736 A1 | 3/2007 | Tsutsumi et al. | 524/413 |

FOREIGN PATENT DOCUMENTS

| JP | 3062497 B1 | 4/2000 |
| JP | 2000-344520 | 12/2000 |
| JP | 2001-302914 A | 10/2001 |
| JP | 2003-138146 | 5/2003 |
| JP | 2003138146 A * | 5/2003 |

(Continued)

OTHER PUBLICATIONS

English translation of JP 2003-138146A May 2003.*

(Continued)

*Primary Examiner* — Alicia Toscano
(74) *Attorney, Agent, or Firm* — Kubovcik & Kubovcik

(57) ABSTRACT

Disclosed are: a compatibilizing agent for a polymer alloy, which can increase the compatibility with a variety of polymers; a polymer alloy using the compatibilizing agent; and master batch for a polymer alloy. Specifically disclosed is a compatibilizing agent which is used for the preparation of a polymer alloy by blending at least one polymer (A) selected from the group consisting of a polyphenylene sulfide, a polyphenylene ether and a polyamide with a polymer (B) of a different type from the polymer (A) at such a ratio that the amount of the polymer (A) blended is the same as or more than that of the polymer (B). The compatibilizing agent comprises a nanosheet-shaped layered titanic acid which is produced by intercalate an organic basic compound between the layers of a layered titanic acid.

10 Claims, 5 Drawing Sheets

(a)

(b)

(c)

FOREIGN PATENT DOCUMENTS

| | | | |
|---|---|---|---|
| JP | 2004-269563 | A | 9/2004 |
| JP | 2004-331844 | A | 11/2004 |
| WO | 99/11574 | A | 3/1999 |
| WO | 03/016218 | A1 | 2/2003 |
| WO | 03/037797 | A1 | 5/2003 |
| WO | 03/055947 | A1 | 7/2003 |
| WO | 2004/010439 | A1 | 1/2004 |

OTHER PUBLICATIONS

Chinese Office Action dated Dec. 31, 2010, issued in Chinese Patent Application No. 200780031035X.

Yongjin Li et al., "Novel morphologies of poly(phenylene oxide) (PPO)/polyamide 6 (PA6) blend nanocomposites" Polymer 45 (2004) pp. 7381-7388.

* cited by examiner

[FIG. 1]
(a) 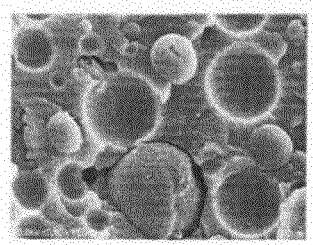  (b) 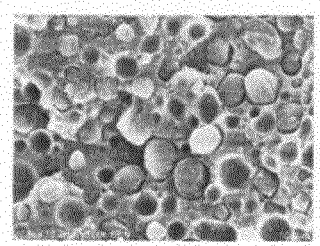  (c) 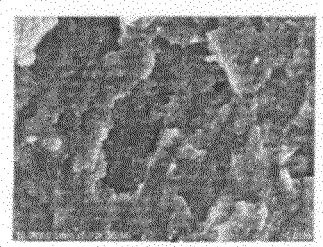
[FIG. 2]
(a) 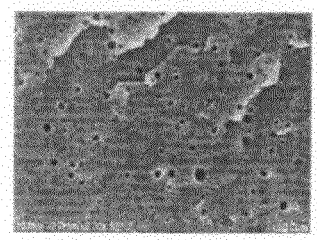  (b) 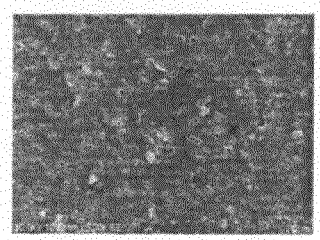
[FIG. 3]
(a) 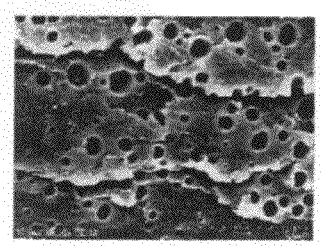  (b) 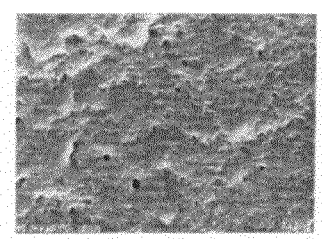

[FIG. 4]
(a) 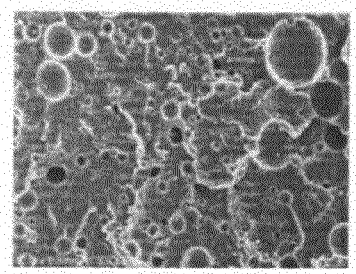 (b) 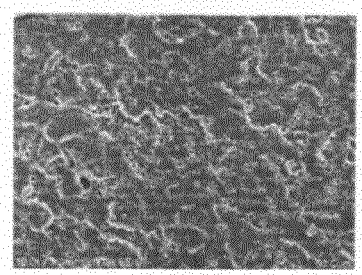
[FIG. 5]
(a) 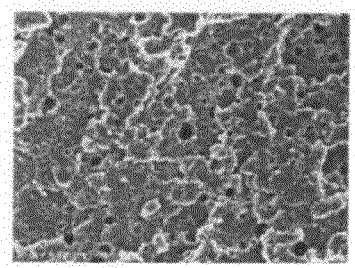 (b) 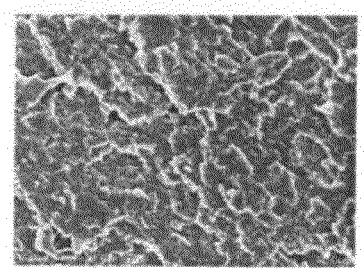

[FIG. 6]
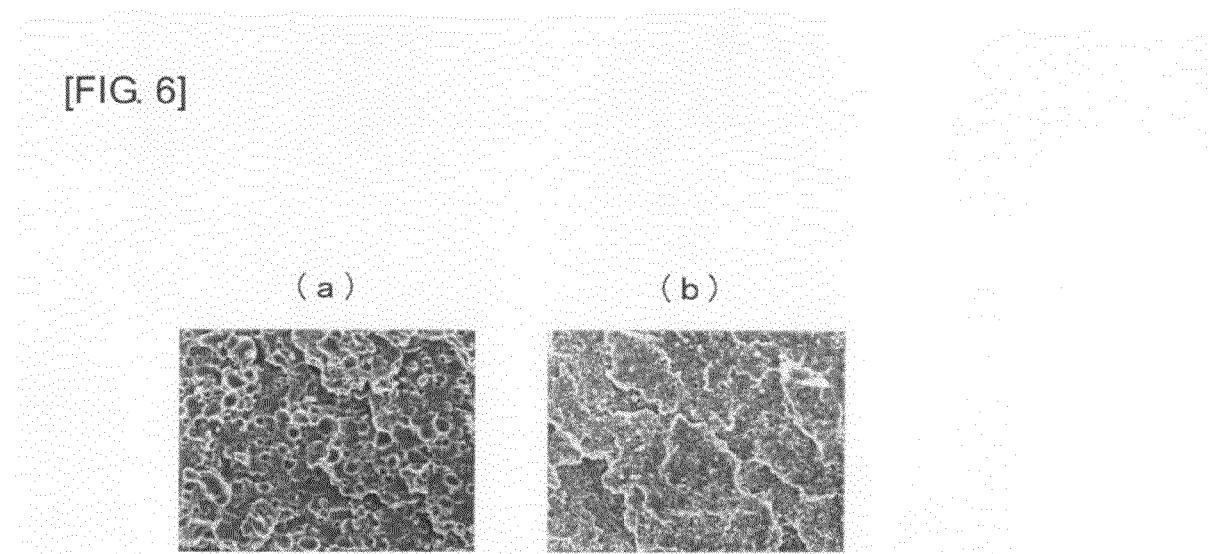
[FIG. 7]
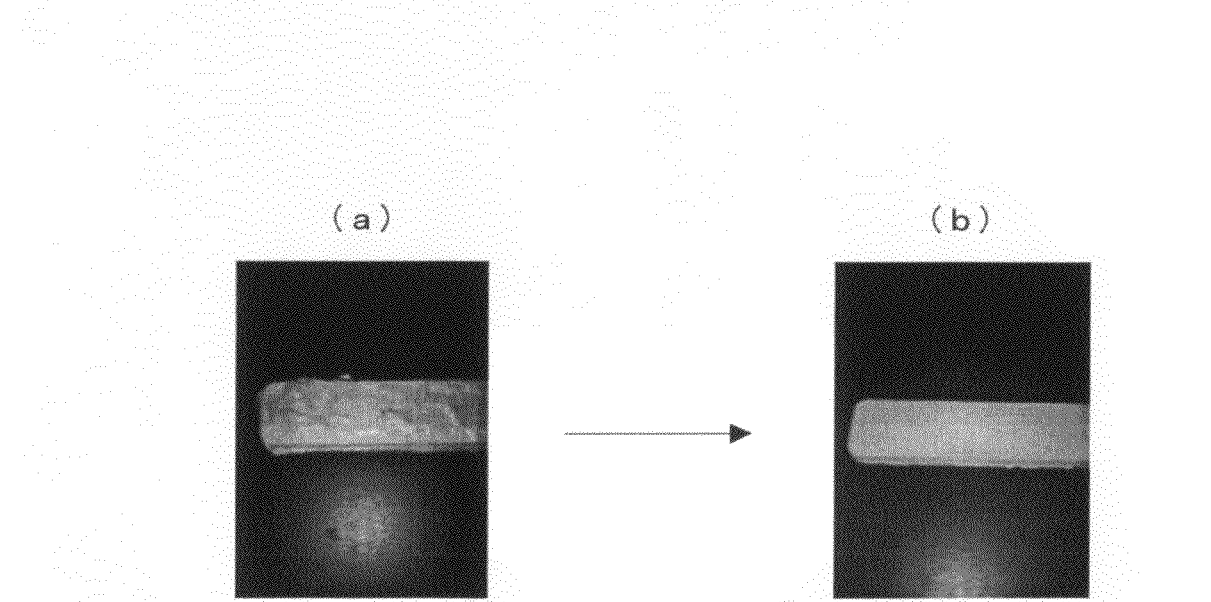

[FIG. 8]
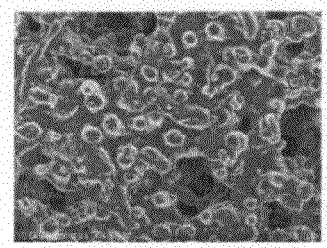
[FIG. 9]
(a) (b) (c)
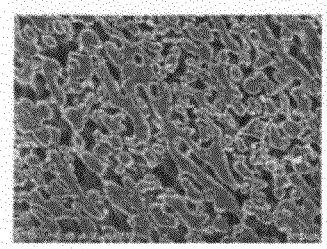 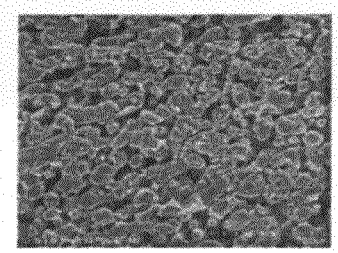 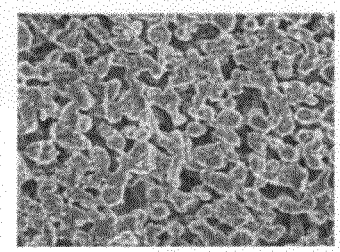

[FIG. 10]
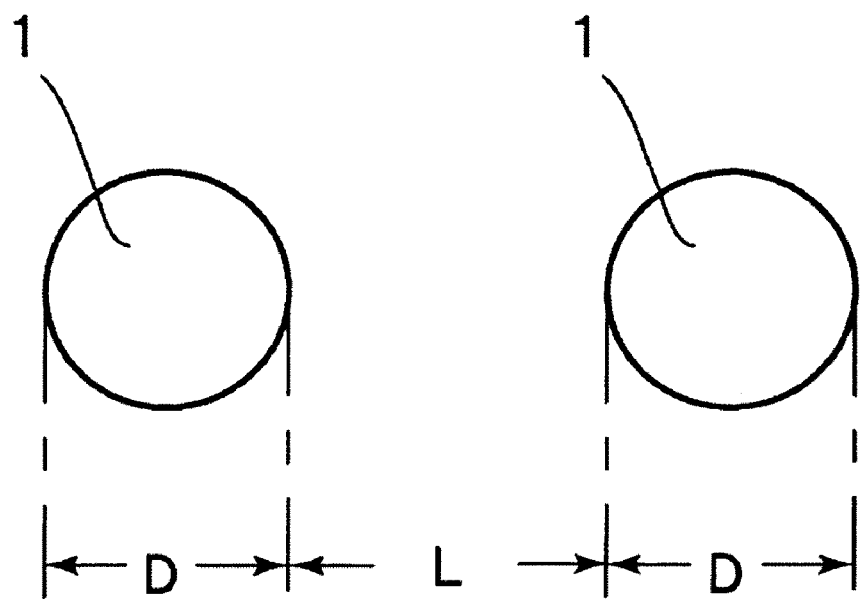

COMPATIBILIZING AGENT FOR POLYMER ALLOY, POLYMER ALLOY, AND MASTER BATCH FOR PREPARATION OF POLYMER ALLOY

This application is a 371 of international application PCT/JP2007/065942, filed Aug. 16, 2007, which claims priority based on Japanese patent application No. 2006-224147 filed Aug. 21, 2006, which is incorporated herein by reference.

FIELD OF THE INVENTION

The present invention relates to a compatibilizing agent for polymer alloy, a polymer alloy, and a master batch for preparation of a polymer alloy.

BACKGROUND ART

In recent years, techniques for preparing polymer alloys by blending a plurality of different types of polymers have been actively researched to obtain polymers having improved physical properties. A polymer alloy is prepared by blending a plurality of different types of polymers for the purpose of obtaining a polymer combining the characteristics of all the polymers blended. Such a polymer alloy is formed from existing polymers, and therefore there are advantages that the properties of a novel polymer obtained by polymer blending can be predicted and that risks associated with the development of a polymer alloy are less than those associated with the development of a novel polymer. For this reason, attention is being given to the development of polymer alloys in the fields of automobile parts, electric and electronic material parts, and the like.

However, when polymers to be blended have an incompatible relationship that they are not dissolved therewith each other, there is a case where the polymers are not sufficiently dispersed simply by blending them together so that a modification effect is not obtained. It is known that, in such a case, dispersibility of both polymer phases can be improved by using a compatibilizing agent. Various compatibilizing agents have been reported. For example, it is described that describes that addition of layered silicate to a blend of polyamide and polyphenylene oxide makes it possible to selectively disperse the layered silicate in a polyamide phase, thereby allowing a polymer alloy having a controlled higher-order structure to be produced (Non-Patent Document 1). However, in this document, target polymers are only polyamide and polyphenylene oxide, and there is no description about preparation of polymer alloys obtained by blending a variety of polymers having different behaviors.

Patent Documents 1 to 3 each disclose a method for producing a layered titanate which can be used as a raw material of a compatibilizing agent according to the present invention.

Non-Patent Document 1: Y. Li and H. Shimizu; Polymer, 45, 7381-7388 (2004)
Patent Document 1: WO 99/11574
Patent Document 2: Japanese Patent No. 3062497
Patent Document 3: WO 03/037797

DISCLOSURE OF THE INVENTION

It is an object of the present invention to provide a compatibilizing agent for polymer alloy, which can improve compatibility between two or more polymers, a polymer alloy using the compatibilizing agent, and a master batch for polymer alloy.

In view of the circumstances described above, the present inventors have extensively studied to find an excellent compatibilizing agent. As a result, the present inventors have found that compatibility between at least one polymer (A) selected from the group consisting of polyphenylene sulfide, polyphenylene ether, and polyamide and a polymer (B) of a different type from the polymer (A) can be improved by using, as a compatibilizing agent for polymer alloy, nanosheet-shaped layered titanic acid obtained by intercalating an organic basic compound between the layers of layered titanic acid. This finding has led to the completion of the present invention.

More specifically, the present invention is directed to a compatibilizing agent for use in preparing a polymer alloy by blending at least one polymer (A) selected from the group consisting of polyphenylene sulfide, polyphenylene ether, and polyamide and a polymer (B) of a different type from the polymer (A) at such a blending ratio that the amount of the polymer (A) is the same as or larger than that of the polymer (B), the compatibilizing agent comprising nanosheet-shaped layered titanic acid obtained by intercalating an organic basic compound between the layers of layered titanic acid.

By blending at least one polymer (A) selected from the group consisting of polyphenylene sulfide, polyphenylene ether, and polyamide and a polymer (B) of a different type from the polymer (A) with the use of the compatibilizing agent according to the present invention, it is possible to prepare a polymer alloy excellent in mutual dispersibility of the polymers.

As described above, the compatibilizing agent according to the present invention comprises nanosheet-shaped layered titanic acid, wherein a layered part of titanic acid is formed in nanosheet-shaped, obtained by intercalating an organic basic compound between the nanosheet-shaped layers of layered titanic acid. Examples of the layered titanic acid include those obtained by treating a titanate with an acid or hot water.

Examples of the layered titanate include those represented by a general formula $A_xM_yB_zTi_{\{2-(Y+Z)\}}O_4$ (wherein A and M represent monovalent to trivalent metals different from each other, B represents a defective portion of Ti, X is a positive real number and satisfies $0<X<1.0$, and Y and Z are each 0 or a positive real number and satisfy $0<Y+Z<1$). A specific example of such a layered titanate includes one represented by $K_{0.5-0.8}Li_{0.27}Ti_{1.73}O_{3.85-4}$.

The present invention is also directed to a polymer alloy obtained by blending, with the use of the compatibilizing agent according to the present invention for polymer alloy, the polymer (A) and the polymer (B) at such a blending ratio that the amount of the polymer (A) is the same as or larger than that of the polymer (B). The polymer (B) is not particularly limited as long as it is of a different type from the polymer (A). Examples of such a polymer (B) include polyphenylene sulfide, polyphenylene ether, polyamide, polyester, polyolefin, polycarbonate, polystyrene, and thermoplastic elastomer. In a case where polyphenylene sulfide, polyether, or polyamide is used as a polymer to be contained in a polymer alloy and the polymer is blended with another polymer at such a blending ratio that the amount of the polymer is the same as or larger than that of the another polymer, the polymer is defined as a polymer (A). On the other hand, in a case where the polymer is blended with another polymer at such a blending ratio that the amount of the polymer is less than that of another polymer, the polymer is defined as a polymer (B). Therefore, the polymer alloy according to the present invention also includes polymers obtained by blending at least two polymers selected from the group consisting of polyphenylene sulfide, polyphenylene ether, and polyamide.

The polymer alloy according to the present invention may also be one obtained by blending three or more polymers.

The polymer alloy according to the present invention preferably contains the compatibilizing agent for polymer alloy in an amount of 0.1 to 30 wt %.

The present invention is also directed to a master batch for use in preparing the polymer alloy according to the present invention, which is obtained by kneading the polymer (A) and the compatibilizing agent for polymer alloy according to the present invention.

By kneading the master batch according to the present invention with the polymer (B), it is possible to easily prepare a polymer alloy according to the present invention.

Therefore, the present invention is also directed to a method for producing a polymer alloy, comprising blending the master batch according to the present invention and the polymer (B).

EFFECT OF THE INVENTION

According to the present invention, it is possible to provide a compatibilizing agent for polymer alloy, which can improve compatibility between two or more polymers, a polymer alloy using the compatibilizing agent, and a master batch for polymer alloy.

BRIEF DESCRIPTION OF THE DRAWINGS

FIGS. 1(a), 1(b) and 1(c) show scanning electron micrographs of fractured surfaces of molded products of a blank sample for comparison with polymer alloys of Examples 1 and 2, the polymer alloy of Example 1, and the polymer alloy of Example 2, respectively;

FIGS. 2(a) and 2(b) show scanning electron micrographs of fractured surfaces of molded products of a blank sample for comparison with a polymer alloy of Example 3 and the polymer alloy of Example 3, respectively;

FIGS. 3(a) and 3(b) show scanning electron micrographs of fractured surfaces of molded products of a blank sample for comparison with a polymer alloy of Example 4 and the polymer alloy of Example 4, respectively;

FIGS. 4(a) and 4(b) show scanning electron micrographs of fractured surfaces of molded products of a blank sample for comparison with a polymer alloy of Example 9 and the polymer alloy of Example 9, respectively;

FIGS. 5(a) and 5(b) show scanning electron micrographs of fractured surfaces of molded products of a blank sample for comparison with a polymer alloy of Example 10 and the polymer alloy of Example 10, respectively;

FIGS. 6(a) and 6(b) show scanning electron micrographs of fractured surfaces of molded products of a blank sample for comparison with a polymer alloy of Example 11 and the polymer alloy of Example 11, respectively;

FIGS. 7(a) and 7(b) show photographs of surfaces of the molded products of the blank sample for comparison with the polymer alloy of Example 1 and the polymer alloy of Example 1, respectively;

FIG. 8 is a scanning electron micrograph of fractured surface of a molded product of a polymer alloy of Comparative Example 13;

FIGS. 9(a), 9(b) and 9(c) show scanning electron micrographs of fractured surfaces of molded products of a polymer alloy of Example 23, a polymer alloy of Example 24, and a polymer alloy of Example 25, respectively; and FIG. 10 is a schematic view for explaining a domain size (an average diameter of domains) and a distance between domains in the phase separation structure of a polymer alloy.

DESCRIPTION OF REFERENCE NUMERALS 1   domain

BEST MODE FOR CARRYING OUT THE INVENTION

The present invention provides a compatibilizing agent for use in preparing a polymer alloy by blending at least one polymer (A) selected from the group consisting of polyphenylene sulfide, polyphenylene ether, and polyamide and a polymer (B) of a different type from the polymer (A) at such a blending ratio that the amount of the polymer (A) is the same as or larger than that of the polymer (B), the compatibilizing agent comprising nanosheet-shaped layered titanic acid obtained by intercalating an organic basic compound between the layers of layered titanic acid.

The compatibilizing agent according to the present invention for polymer alloy comprises nanosheet-shaped layered titanic acid obtained by intercalating an organic basic compound between the layers of layered titanic-acid. Such nanosheet-shaped layered titanic acid is not particularly limited, and various well-known ones can be used.

An example of the nanosheet-shaped layered titanic acid includes one obtained by treating a layered titanate with an acid to obtain layered titanic acid and then allowing an organic basic compound having an interlayer space swelling action to liberate on the layered titanic acid to intercalate the organic basic compound between the layers of the layered titanic acid.

An example of the layered titanate includes $K_{0.8}Li_{0.27}Ti_{1.73}O_4$ obtained by mixing potassium carbonate, lithium carbonate, and titanium dioxide at a ratio (mole ratio) of K/Li/Ti=3/1/6.5, triturating the mixture, and firing the triturated mixture at 800° C. according to the method disclosed in Patent Document 1.

Another example of the layered titanate includes one represented by a formula $A_xM_y\square Ti_{2-(y+z)}O_4$ (wherein A and M represent monovalent to trivalent metals different from each other, $\square$ represents a defective portion of Ti, x is a positive real number and satisfies $0<x<1.0$, and y and z are each 0 or a positive real number and satisfy $0<y+z<1.0$), which is obtained by mixing an alkali metal or a halide or sulfate of an alkali metal as a flux and a raw material so that a weight ratio of flux/raw material is 0.1 to 2.0 and then firing the mixture at 700 to 1200° C. according to the method disclosed in Patent Document 2.

In the above formula, A represents a monovalent to trivalent metal, and is preferably at least one selected from K, Rb, and Cs, and M represents a monovalent to trivalent metal different from a metal represented by A, and is preferably at least one selected from Li, Mg, Zn, Cu, Fe, Al, Ga, Mn and Ni.

Specific examples of such a layered titanate include $K_{0.80}Li_{0.27}Ti_{1.73}O_4$, $Rb_{0.75}Ti_{1.75}Li_{0.25}O_4$, $Cs_{0.70}Li_{0.23}Ti_{1.77}O_4$, $Ce_{0.70}\square_{0.18}Ti_{1.83}O_4$, $Ce_{0.70}Mg_{0.35}Ti_{1.55}O_4$, $K_{0.8}Mg_{0.4}Ti_{1.6}O_4$, $K_{0.8}Ni_{0.4}Ti_{1.6}O_4$, $K_{0.8}Zn_{0.4}Ti_{1.6}O_4$, $K_{0.8}Cu_{0.4}Ti_{1.6}O_4$, $K_{0.8}Fe_{0.8}Ti_{1.2}O_4$, $K_{0.8}Mn_{0.8}Ti_{1.2}O_4$, $K_{0.76}Li_{0.22}Mg_{0.05}Ti_{1.73}O_4$, and $K_{0.67}Li_{0.2}Al_{0.07}Ti_{1.73}O_4$.

Yet another example of the layered titanate includes $K_{0.5 \; to \; 0.7}Li_{0.27}Ti_{1.73}O_{3.85 \; to \; 3.95}$ obtained by washing $K_{0.8}Li_{0.27}Ti_{1.73}O_4$ with an acid, followed by firing according to the method disclosed in Patent Document 3.

Examples of the layered titanic acid include those obtained by treating the above-described layered titanate with an acid to substitute hydrogen ions or hydronium ions for exchangeable metal cations. The acid for use in acid treatment is not particularly limited. For example, a mineral acid such as hydrochloric acid, sulfuric acid, nitric acid, phosphoric acid, or boric acid can be used. Alternatively, an organic acid may also be used.

Examples of the nanosheet-shaped layered titanic acid include those obtained by allowing an organic basic compound having an interlayer space swelling action to liberate on the above-described layered titanic acid.

The organic basic compound having an interlayer space swelling effect can be selected from well-known ones such as amine-based compounds, ammonium-based compounds, and phosphorus-based compounds. Specific examples of such an organic basic compound include: primary amines such as pentylamine, hexylamine, octylamine, dodecylamine, stearylamine, and 2-ethylhexylamine and salts thereof; secondary amines such as dipentylamine and dioctylamine and salts thereof; tertiary amines such as trioctylamine and salts thereof; quaternary ammonium salts such as distearyldimethyl ammonium, octadecyltrimethyl ammonium, octadecyldimethylbenzyl ammonium, and alkyl methyl bis-hydroxyethyl ammonium; quaternary phosphonium salts such as dodecyltributylphosphonium, hexadecyltributylphosphonium, and dodecyltriphenylphosphonium; and aminocarboxylic acids such as 12-aminododecanoic acid and salts thereof.

An example of a method for allowing an organic basic compound having an interlayer space swelling action to liberate on layered titanic acid includes a method in which a basic compound or a solution obtained by diluting a basic compound with an aqueous medium is added under stirring to a suspension in which layered titanic acid obtained by acid treatment or hot water treatment is dispersed in an aqueous medium. Alternatively, the layered titanic acid or a suspension thereof may be added under stirring to an aqueous solution of the basic compound.

The term "aqueous medium" or "aqueous solution" as used herein refers to water, a water-soluble solvent, a mixed solvent of water and a water-soluble solvent, or a solution thereof.

Examples of the water-soluble solvent include: alcohols such as methyl alcohol, ethyl alcohol, and isopropyl alcohol; ketones such as acetone; ethers such as tetrahydrofuran and dioxane; nitriles such as acetonitrile; and esters such as ethyl acetate and propylene carbonate.

The basic compound is added preferably in an amount of 0.3 to 10 equivalents, more preferably 0.5 to 2 equivalents of the ion-exchange capacity of a layered titanate used. The term "ion-exchange capacity" as used herein refers to the amount of exchangeable metal cations. For example, in a case where the layered titanate is represented by a general formula $A_xM_y\square_zTi_{2-(y+z)}O_4$, a value represented by mx+ny, where m is the valence of A and n is the valence of M.

The reaction is usually carried out at room temperature to 90° C. for about 30 minutes to 24 hours. After the completion of the reaction, a slurry obtained is filtered to obtain a wet solid, and the wet solid is washed with water or an aqueous solvent to remove the excess organic basic compound and is then dried at 80 to 200° C. for about 1 to 12 hours. In this way, nanosheet-shaped layered titanic acid is obtained. The drying is carried out under a reduced pressure, preferably at 10 mmHg or less. When the drying is carried out under ordinary pressure, there is a fear that colored nanosheet-shaped layered titanic acid is obtained, thus resulting in preparation of a polymer alloy poor in appearance.

Examples of the polyphenylene sulfide to be used in the present invention include polymers having a constitutional unit represented by the following formula (1) in their main chain:

[Chem. 1]

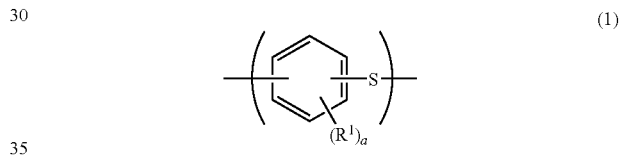

(1)

(wherein $R^1$ represents a substituent group selected from an alkyl group having 6 carbon atoms or less, an alkoxyl group having 6 carbon atoms or less, a phenyl group, a carboxyl group or a metal salt thereof, an amino group, a nitro group, and a halogen atom such as fluorine, chlorine, or bromine and a is an integer of 0 to 4).

The polymer is not limited to a homopolymer and may be a copolymer. Examples of a constitutional unit of such a copolymer include an m-phenylene sulfide unit, an o-phenylene sulfide unit, a p,p'-diphenylene ketone sulfide unit, a p,p'-diphenylene sulfone sulfide unit, a p,p'-biphenylene sulfide unit, a p,p'-diphenylene methylene sulfide unit, a p,p'-diphenylene cumenyl sulfide unit, and a naphthyl sulfide unit.

The molecular structure of the polymer may be any of a linear structure, a branched structure, and a cross-linked structure, but is preferably of a linear type and/or a semi-linear type.

Examples of the polyamide to be used in the present invention include aliphatic nylons such as 4-nylon, 6-nylon, 6,6-nylon, 4,6-nylon, 6,10-nylon, 6,12-nylon, 11-nylon, and 6,10-nylon and aromatic nylons such as MXD6-nylon.

Examples of the polyphenylene ether to be used in the present invention include polymers having a constitutional unit represented by the following formula (2) in their main chain:

[Chem. 2]

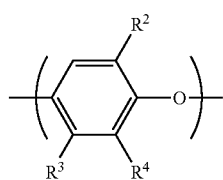

(2)

(wherein $R^4$ represents a lower alkyl group having 1 to 3 carbon atoms and $R^2$ and $R^3$ each represent a hydrogen atom or a lower alkyl group having 1 to 3 carbon atoms).

The polymer is not limited to a homopolymer and may be a copolymer. Examples of such a copolymer include poly(2,6-dimethyl-1,4-phenylene)ether, poly(2,6-diethyl-1,4-phenylene)ether, poly(2,6-dipropyl-1,4-phenylene)ether, and poly(2-methyl-6-propyl-1,4-phenyelene)ether.

The polymer (B) which is used to prepare a polymer alloy according to the present invention and which is of a different type from at least one polymer (A) selected from the group consisting of polyphenylene sulfide, polyphenylene ether, and polyamide is not particularly limited, and any well-known one can be used. Examples of the polymer (B) include polyphenylene sulfide, polyetherimide, polyethersulfone, polyphenylene ether, polyether ketone-based resin (e.g., polyketone, polyether ketone, polyether ether ketone, polyether ketone ketone, and polyether ether ketone), polycarbonate, polyolefin, polyester, polyacetal, thermoplastic polyurethane, polyamide, polyacrylate, polyvinyl chloride, polystyrene, polyvinylidene fluoride, polyvinylidene chloride, polyphenylsulfone, polysulfone, liquid crystal polymer, thermoplastic polyimide, polyallylate, polyether nitrile, and thermoplastic elastomer.

Among these polymers, at least one selected from polyphenylene sulfide, polyamide, polyester, polycarbonate, polyphenylene ether, polystyrene, polyolefin, and thermoplastic elastomer is preferably used as the polymer (B).

Examples of the polyester include polyethylene terephthalate, polybutylene terephthalate, polytetramethylene terephthalate, polyethylene naphthalate, and polytetramethylene naphthalate.

Examples of the polycarbonate include aromatic polycarbonates such as bisphenol A polycarbonate.

The term "polystyrene" includes styrene polymers and polymers mainly containing styrene. Examples of the polystyrene include general purpose polystyrene, high impact polystyrene, acrylonitrile-styrene (AS) resin, and acrylonitrile-butadiene-styrene (ABS) resin.

Examples of the polyolefin include polyolefins or oligomers such as polyethylene, polypropylene, a copolymer of ethylene and α-olefin, a copolymer of propylene and α-olefin, polybutene, and poly-4-methylpentene-1 and polyolefins modified with, for example, maleic acid so as to have polarity.

Examples of the thermoplastic elastomer include polystyrene-based thermoplastic elastomer, polyolefin-based thermoplastic elastomer, polyurethane-based thermoplastic elastomer, and polyamide-based thermoplastic elastomer.

The polymer (B) of a different type from the polymer (A) may be modified with an acid. Examples of the polymer (B) modified with an acid include polymers modified with a saturated or unsaturated aliphatic polyvalent carboxylic acid anhydride, an alicyclic polyvalent carboxylic acid anhydride, or an aromatic polyvalent carboxylic acid anhydride. Further, some of the acid-modification groups of the acid-modified polymer (B) may be substituted with a saturated or unsaturated hydrocarbon group, an aromatic group, a halogen atom, and/or a heterocyclic group.

Specific examples of an acid for use in acid modification include maleic anhydride, phthalic anhydride, succinic anhydride, itaconic anhydride, glutaric anhydride, dodecenylsuccinic anhydride, pyromellitic anhydride, trimellitic anhydride, cyclopentane tetracarboxylic dianhydride, hexahydrophthalic anhydride, methylhexahydrophthalic anhydride, tetrahydrophthalic anhydride, methyltetrahydrophthalic anhydride, endomethylenetetrahydrophthalic anhydride, methylendomethylenetetrahydrophthalic anhydride, methylnadic anhydride (methyl-5-norbornene-2,3-dicarboxylic anhydride), and benzophenonetetracarboxylic anhydride. Among these acids, maleic anhydride, phthalic anhydride, and succinic anhydride are preferable.

In usual, the amount of the compatibilizing agent for polymer alloy to be contained in the polymer alloy according to the present invention is preferably in the range of 0.1 to 30 wt %, more preferably in the range of 0.5 to 20 wt %, even more preferably in the range of 1.0 to 15 wt % based on the total weight of the polymer alloy. When the amount of the compatibilizing agent for polymer alloy contained in the polymer alloy according to the present invention is less than 0.1 wt %, there is a fear that the compatibility between polymers is not sufficiently improved. On the other hand, even if the amount of the compatibilizing agent for polymer alloy contained in the polymer alloy according to the present invention exceeds 30 wt %, an effect is not enhanced, which results in diseconomy.

When the polymer alloy according to the present invention is prepared, at least one polymer (A) selected from the group consisting of polyphenylene sulfide, polyphenylene ether, and polyamide and a polymer (B) of a different type from the polymer (A) are blended at such a blending ratio that the amount of the polymer (A) is the same as or larger than that of the polymer (B).

The polymer alloy according to the present invention can be prepared by blending together the compatibilizing agent for polymer alloy, at least one polymer (A) selected from the group consisting of polyphenylene sulfide, polyphenylene ether, and polyamide, and a polymer (B) of a different type from the polymer (A) in their respective predetermined amounts and melt-kneading them.

A method for melt-kneading the compatibilizing agent is not particularly limited as long as mechanical shearing can be performed in the molten state of the polymers. Specific kneading machine are preferably extruders and in particular preferably extruders, twin screw. The kneading machine preferably has a vent for removing moisture and low-molecular weight volatile components generated in the process of melt-kneading.

In the case of using a biaxial extruder, the melt-kneading method is not particularly limited, and various methods can be employed. For example, the compatibilizing agent, at least one polymer (A) selected from the group consisting of polyphenylene sulfide, polyphenylene ether, and polyamide, and a polymer (B) of a different type from the polymer (A) may be melt-kneaded in such a manner that a mixture previously prepared by blending them using a blender or the like is fed through a feeding port located in the upstream part of the extruder and the compatibilizing agent for polymer alloy is fed through a feeding port located in the downstream part of the extruder or in such a manner that all the polymers to be blended and the compatibilizing agent are previously mixed using a blender or the like and the mixture is fed through a feeding port of the extruder. There is no particular limitation on a screw arrangement in the extruder, but a kneading zone is preferably provided in order to sufficiently disperse polymers to facilitate improvement in compatibility between the polymers.

The polymer alloy according to the present invention can be obtained also by preparing a master batch for polymer alloy by melt-kneading the compatibilizing agent for polymer alloy and at least one polymer (A) selected from the group consisting of polyphenylene sulfide, polyphenylene ether, and polyamide and melt-kneading the master batch and a polymer (B) of a different type from the polymer (A).

The polymer alloy obtained in such a manner as described above has improved compatibility between polyphenylene sulfide and another type of thermoplastic polymer. When a polymer alloy causes phase separation, delamination is observed in the surface of a molded product of the polymer alloy. Improved compatibility between different types of polymers can be determined by observing a continuous- and dispersed-phase structure, that is, a sea-island structure formed by the polymers by scanning electron microscope observation of the fractured surface of a molded product or by transmission electron microscope observation of the ultrathin section obtained from a molded product.

The polymer alloy according to the present invention may further contain a conventionally-used additive according to its purpose of use as long as the effect of the present invention is not impaired. Examples of such an additive include reinforcing agents such as glass fiber, carbon fiber, potassium titanate whisker, inorganic fillers such as talc, mica, calcium carbonate, and wollastonite, plasticizers, crystalnucleating agents, releasing agents, coloring inhibitors, antioxidants, heat stabilizers, lubricants, anti-UV agents, and colorants.

EXAMPLES

Hereinbelow, the present invention will be more specifically described with reference to the following examples. However, the present invention is not limited to these examples and can be appropriately changed or modified without departing from the gist of the present invention.

Polymers used in the following examples are as follows.

polyphenylene sulfide (hereinafter PPS); FORTRON W214A (manufactured by Polyplastics Co., Ltd.)

6-nylon (hereinafter PA6); ARAMINE CM1017 (manufactured by Toray Industries, Inc.)

polybutylene terephthalate (hereinafter abbreviated as PBT); DURANEX2002 (manufactured by Polyplastics Co., Ltd.)

polycarbonate (hereinafter PC); NOVAREX 7022 (manufactured by Mitsubishi Engineering-Plastics Corporation)

polyphenylene ether (hereinafter PPE); P101M (manufactured by Asahi Kasei Corporation)

polystyrene (hereinafter PSt); GP-666R (manufactured by Asahi Kasei Corporation)

polyethylene (hereinafter PE); HIZEX2100 (manufactured by Mitsui Chemicals)

ethylene-butadiene rubber (hereinafter EBR); TAFMER A-0550 (manufactured by Mitsui Chemicals)

maleic anhydride-modified polyethylene (hereinafter mPE); ADMER HE040 (manufactured by Mitsui Chemicals)

maleic anhydride-modified ethylene-butadiene rubber (hereinafter mEBR); TAFMER MH5020 (manufactured by Mitsui Chemicals)

(Preparation of Nanosheet-shaped Layered Titanic Acid A)

27.64 g of potassium carbonate, 4.91 g of lithium carbonate, 69.23 g of titanium dioxide, and 74.56 g of potassium chloride were ground and mixed in a dry manner to obtain a raw material, and the raw material was fired at 1100° C. for 4 hours to obtain a sample. After firing, the sample was immersed in 10 kg of pure water to obtain a suspension, and the suspension was stirred for 20 hours. Then, a wet solid was separated from the suspension, washed with water, and dried at 110° C. to obtain a white powder. The white powder was a layered titanate $K_{0.8}Li_{0.27}Ti_{1.73}O_4$ having an average major diameter of 44 μm.

65 g of the layered titanate was dispersed in 1 kg of deionized water to obtain a suspension, 28 g of 35% hydrochloric acid was added to the suspension, and the suspension was stirred for 1.5 hour to exchange K ions and Li ions for hydrogen ions or hydronium ions. Then, a wet solid was separated from the suspension and washed with water to obtain layered titanic acid. The exchange rate of K ions was 72 equivalent %, and the exchange rate of Li ions was 99 equivalent % or more. The interlayer distance of the layered titanic acid was found to be 9.2 Å by XRD analysis.

50 g of the layered titanic acid was further dispersed in 4 kg of deionized water to obtain a suspension, and a solution obtained by dissolving 128 g of hexadecyltributylphosphonium bromide in 500 g of deionized water was added to the suspension while the suspension was heated to 80° C. and stirred. After 1 hour, heating and stirring were discontinued, and the suspension was filtered to separate a wet solid. The wet solid was sufficiently washed with deionized water having a temperature of 80° C., dried at 40° C. in air, and further dried at 140° C. for 12 hours under a reduced pressure to obtain nanosheet-shaped layered titanic acid having an average major diameter of 42 μm. The interlayer distance of the nanosheet-shaped layered titanic acid was found to be 31.1 Å by XRD analysis. In addition, it was confirmed that hexadecyltributylphosphonium was intercalated between the layers of the nanosheet-shaped layered titanic acid. The organic matter content of the nanosheet-shaped layered titanic acid was found to be 29.6 wt % by measuring weight loss due to thermal decomposition by TG/DTA.

(Preparation of Nanosheet-shaped Layered Titanic Acid B)

27.64 g of potassium carbonate, 4.91 g of lithium carbonate, and 69.23 g of titanium dioxide were ground and mixed in a dry manner to obtain a raw material, and the raw material was fired at 1050° C. for 4 hours to obtain a sample. After firing, the sample was immersed in 10 kg of pure water to obtain a suspension, and the suspension was stirred for 20 hours. Then, a wet solid was separated from the suspension, washed with water, and dried at 110° C. to obtain a layered titanate. 79.2 L of a 10.9% aqueous slurry of the layered titanate was prepared, and then the slurry was mixed with 4.7 kg of a 10% aqueous sulfuric acid solution and stirred for 2 hours to adjust the pH of the slurry to 7.0. A wet solid was separated from the slurry, washed with water, dried at 110° C., and fired at 600° C. for 12 hours to obtain a white powder. The white powder was a layered titanate $K_{0.6}Li_{0.27}Ti_{1.73}O_{3.9}$ having an average major diameter of 28 μm.

The layered titanate was treated in the same manner as in the preparation of nanosheet-shaped layered titanic acid A except that the organic basic compound was changed to octadecyldimethylbenzylammonium chloride to thereby obtain nanosheet-shaped layered titanic acid having an average major diameter of 27 μm. The interlayer distance of the nanosheet-shaped layered titanic acid was found to be 24.7 Å by XRD analysis. In addition, it was confirmed that octadecyldimethylbenzylammonium was intercalated between the layers of the nanosheet-shaped layered titanic acid. The organic matter content of the nanosheet-shaped layered titanic acid was found to be 41.5 wt % by measuring weight loss due to thermal decomposition by TG/DTA.

(Preparation of Nanosheet-shaped Layered Titanic Acid C)

A layered titanate $K_{0.80}Li_{0.266}Ti_{1.733}O_4$ was synthesized under the same conditions as in the preparation of nanosheet-shaped layered titanic acid B.

The thus obtained layered titanate was treated in the same manner as in the preparation of nanosheet-shaped layered titanic acid A except that the organic basic compound was changed to dodecylmethylbis(hydroxyethyl) ammonium chloride to thereby obtain nanosheet-shaped layered titanic acid having an average major diameter of 27 μm. The interlayer distance of the nanosheet-shaped layered titanic acid was found to be 33.4 Å by XRD analysis. In addition, it was confirmed that dodecylmethylbis(hydroxyethyl)ammonium was intercalated between the layers of the nanosheet-shaped layered titanic acid. The organic matter content of the nanosheet-shaped layered titanic acid was found to be 21.2 wt % by measuring weight loss due to thermal decomposition by TG/DTA.

(Preparation of Nanosheet-shaped Layered Titanic Acid D)

A layered titanate $K_{0.80}Li_{0.266}Ti_{1.733}O_4$ was synthesized under the same conditions as in the preparation of nanosheet-shaped layered titanic acid B.

130 g of the layered titanate was further dispersed in 4 kg of deionized water to obtain a suspension. 80 g of 35% hydrochloric acid was diluted with 8 kg of deionized water, and then 83 g of 12-aminododecanoic acid was added thereto to dissolve it. The thus obtained solution was added to the suspension while the suspension was heated to 80° C. and stirred. After 1 hour, heating and stirring were discontinued, and the suspension was filtered to separate a wet solid. The wet solid was washed with dilute hydrochloric acid, dried at 40° C. in air, and further dried at 140° C. for 12 hours under a reduced pressure to obtain nanosheet-shaped layered titanic acid having an average major diameter of 25 μm. The interlayer distance of the nanosheet-shaped layered titanic acid was found to be 19.6 Å by XRD analysis. In addition, it was confirmed that 12-aminododecanoic acid was intercalated between the layers of the nanosheet-shaped layered titanic acid. The organic matter content of the nanosheet-shaped layered titanic acid was found to be 23.8 wt % by measuring weight loss due to thermal decomposition by TG/DTA.

(Preparation of Polymer Alloy)

Example 1

79 parts by weight of PPS, 20 parts by weight of PE, and 1 part by weight of the nanosheet-shaped layered titanic acid A obtained by the above-described method were mixed together and melt-kneaded by LABO PLASTOMILL (manufactured by Toyo Seiki Seisaku-sho, Ltd. under the trade name of "4C150-01") at 290° C. at 60 rpm for 5 minutes to obtain an intended polymer alloy. The evaluation results of compatibility between polymers in the polymer alloy are shown in Table 1.

(Evaluation of Compatibility)

Compatibility between polymers in the polymer alloy was evaluated by observing the fractured surface of a molded product of the polymer alloy with a scanning electron microscope (manufactured by Hitachi High-Technologies Corporation under the trade name of "S-4800").

80 parts by weight of PPS and 20 parts by weight of the above-mentioned resin were mixed together and melt-kneaded by LABO PLASTOMILL (which was the same as that described above) at 290° C. at 60 rpm for 5 minutes to obtain a blank sample (comparative sample) not containing the nanosheet-shaped layered titanic acid being the compatibilizing agent according to the present invention.

The blank sample for comparison and the polymer alloy according to the present invention were evaluated based on a domain size (average diameter of domains) and a distance between domains in a phase separation structure. A smaller domain size and a shorter distance between domains in a phase separation structure indicate more uniform dispersion of polymers and higher compatibility between the polymers.

FIG. 10 is a schematic view for explaining a domain size and a distance between domains in a phase separation structure of a so-called sea-island type. As shown in FIG. 10, in a case where island-shaped domains 1 are present, an average diameter of domains 1 determined by averaging the diameters D of the domains 1 is defined as a domain size, and a length L measured between the domains 1 is defined as a distance between domains.

Example 2

65 parts by weight of PPS, 20 parts by weight of PE, and 15 parts by weight of the nanosheet-shaped layered titanic acid A obtained by the above-described method were mixed together and melt-kneaded by LABO PLASTOMILL (same as described above) at 290° C. at 60 rpm for 5 minutes to obtain an intended polymer alloy. The evaluation results of compatibility between polymers in the polymer alloy are shown in Table 1.

TABLE 1

| | | | | Compatibility | | |
| --- | --- | --- | --- | --- | --- | --- |
| | | | | Average Diameter of Domains (μm) | | Distance (μm) |
| Ex. | Nanosheet-Shaped Layered Titanic Acid | Resin Matrix | Resin Domain | Blank Sample | Sample Containing Compatibilizing Agent | Blank Sample | Sample Containing Compatibilizing Agent |
| 1 | A | PPS | PE | 2.6 | 0.8 | 1.2 | 0.5 |
| 2 | A | PPS | PE | 2.6 | 0.2 | 1.2 | 0.4 |

Examples 3 to 11

95 parts by weight of PPS and 5 parts by weight of the nanosheet-shaped layered titanic acid B were mixed together and melt-kneaded by LABO PLASTOMILL (same as described above) at 290° C. at 60 rpm for 5 minutes to obtain a master batch for preparation of a polymer alloy. Then, 80 parts by weight of the master batch and 20 parts by weight of a resin shown as a "domain" in Table 2 were kneaded under the same conditions as described above to obtain an intended polymer alloy. The evaluation results of compatibility between polymers in the polymer alloys are shown in Table 2.

Example 12

95 parts by weight of PPE and 5 parts by weight of the nanosheet-shaped layered titanic acid C were mixed together and melt-kneaded by LABO PLASTOMILL (same as described above) at 290° C. at 60 rpm for 5 minutes to obtain a master batch for preparation of a polymer alloy. Then, 80 parts by weight of the master batch and 20 parts by weight of a resin shown as a "domain" in Table 3 were kneaded under the same conditions as described above to obtain an intended polymer alloy. The evaluation results of compatibility between polymers in the polymer alloy are shown in Table 3.

TABLE 2

| | | | | Compatibility | | |
| --- | --- | --- | --- | --- | --- | --- |
| | | | | Average Diameter of Domains (μm) | | Distance (μm) |
| Ex. | Nanosheet-Shaped Layered Titanic Acid | Resin Matrix | Resin Domain | Blank Sample | Sample Containing Compatibilizing Agent | Blank Sample | Sample Containing Compatibilizing Agent |
| 3 | B | PPS | PA66 | 0.4 | 0.3 | 0.8 | 0.8 |
| 4 | B | PPS | PA6 | 0.8 | 0.2 | 1.1 | 1.0 |
| 5 | B | PPS | PBT | 0.7 | 0.6 | 0.4 | 0.2 |
| 6 | B | PPS | PC | 0.5 | 0.4 | 0.5 | 0.5 |
| 7 | B | PPS | PPE | 0.9 | 0.6 | 0.6 | 0.5 |
| 8 | B | PPS | PE | 2.6 | 0.4 | 1.2 | 0.5 |
| 9 | B | PPS | EBR | 1.7 | 1.4 | 1.0 | 0.8 |
| 10 | B | PPS | mPE | 1.4 | 0.6 | 1.3 | 0.6 |
| 11 | B | PPS | mEBR | 3.1 | 0.7 | 1.6 | 0.5 |

TABLE 3

| | | | Compatibility | | | |
| | | | Average Diameter of Domains (μm) | | Distance (μm) | |
| Ex. | Nanosheet-Shaped Layered Titanic Acid | Resin Matrix | Matrix | Blank Sample | Sample Containing Compatibilizing Agent | Blank Sample | Sample Containing Compatibilizing Agent |
|---|---|---|---|---|---|---|---|
| 12 | C | PPE | PE | 1.1 | 0.8 | 0.4 | 0.4 |

Examples 13 and 14

95 parts by weight of PA66 and 5 parts by weight of the nanosheet-shaped layered titanic acid C were mixed together and melt-kneaded by LABO PLASTOMILL (same as described above) at 290° C. at 60 rpm for 5 minutes to obtain a master batch for preparation of a polymer alloy. Then, 80 parts by weight of the master batch and 20 parts by weight of a resin shown as a "domain" in Table 4 were kneaded under the same conditions as described above to obtain an intended polymer alloy. The evaluation results of compatibility between polymers in the polymer alloys are shown in Table 4.

TABLE 4

| | | | Compatibility | | | |
| | | | Average Diameter of Domains (μm) | | Distance (μm) | |
| Ex. | Nanosheet-Shaped Layered Titanic Acid | Resin Matrix | Matrix | Blank Sample | Sample Containing Compatibilizing Agent | Blank Sample | Sample Containing Compatibilizing Agent |
|---|---|---|---|---|---|---|---|
| 13 | C | PA66 | PE | 1.4 | 0.8 | 1.2 | 0.8 |
| 14 | C | PA66 | PC | Molding was impossible. | 0.4 | Molding was impossible. | 1.1 |

FIGS. 1 to 6 show scanning electron micrographs of fractured surfaces of molded products of the polymer alloys obtained in Examples and the blank samples for comparison with the polymer alloys of Examples.

FIGS. 1(a) to 1(c) show scanning electron micrographs of fractured surfaces of molded products of the blank sample for comparison with the polymer alloys of the Examples 1 and 2, the polymer alloy of Example 1, and the polymer alloy of Example 2, respectively.

FIGS. 2(a) and 2(b) show scanning electron micrographs of fractured surfaces of molded products of the blank sample for comparison with the polymer alloy of Example 3 and the polymer alloy of Example 3, respectively.

FIGS. 3(a) and 3(b) show scanning electron micrographs of fractured surfaces of molded products of the blank sample for comparison with the polymer alloy of Example 4 and the polymer alloy of Example 4, respectively.

FIGS. 4(a) and 4(b) show scanning electron micrographs of fractured surfaces of molded products of the blank sample for comparison with the polymer alloy of Example 9 and the polymer alloy of Example 9, respectively.

FIGS. 5(a) and 5(b) show scanning electron micrographs of fractured surfaces of molded products of the blank sample for comparison with the polymer alloy of Example 10 and the polymer alloy of Example 10, respectively.

FIGS. 6(a) and 6(b) show scanning electron micrographs of fractured surfaces of molded products of the blank sample for comparison with the polymer alloy of Example 11 and the polymer alloy of Example 11, respectively.

FIGS. 7(a) and 7(b) show photographs of surfaces of the molded products of the blank sample for comparison with the polymer alloy of Example 1 and the polymer alloy of Example 1, respectively. As shown in FIG. 7(a), the molded product of the blank sample for comparison containing no compatibilizing agent has surface irregularities. On the other hand, as shown in FIG. 7(b), the molded product of the polymer alloy of Example 1 according to the present invention containing a compatibilizing agent has a smooth surface not having surface irregularities shown in FIG. 7(a).

Examples 15 to 17 and Comparative Examples 1 to 5

PPS, mPE, and the nanosheet-shaped layered titanic acid B obtained by the above-described method were mixed together in their respective amounts shown in Table 5 and melt-kneaded by LABO PLASTOMILL (same as described above) at 290° C. at 60 rpm for 5 minutes to obtain an intended polymer alloy.

Each of the thus obtained polymer alloys of Examples 15 to 17 and Comparative Examples 1 to 5 was fed into an injection molding machine (manufactured by The Japan Steel Works, Ltd. under the trade name of "JS75", cylinder temperature: 330° C.) equipped with a mold for preparing a JIS test piece (mold temperature: 130° C.), and was then injection-molded to prepare various JIS test pieces. The notched IZOD impact value of each of the polymer alloys was evaluated using a No. 1 test piece according to JIS K7110. The test results are shown in Table 5.

TABLE 5

|  | Ex. 15 | Ex. 16 | Ex. 17 | Comp. Ex. 1 | Comp. Ex. 2 | Comp. Ex. 3 | Comp. Ex. 4 | Comp. Ex. 5 |
| --- | --- | --- | --- | --- | --- | --- | --- | --- |
| PPS | 85 | 65 | 45 | 100 | 90 | 70 | 50 | 95 |
| Nanosheet-Shaped Layered Titanic Acid B | 5 | 5 | 5 | 0 | 0 | 0 | 0 | 5 |
| mPE | 10 | 30 | 50 | 0 | 10 | 30 | 50 | 0 |
| IZOD(J/m) | 53 | 60 | 69 | 30 | 51 | 56 | 47 | 22 |

As can be seen from Table 5, the use of an acid-modified polymer, mPE as a polymer (B) increases the IZOD impact strength. An increase in IZOD impact strength indicates an improvement in mechanical strength.

Examples 18 to 20 and Comparative Examples 6 to 10

PPS, mEBR, and the nanosheet-shaped layered titanic acid B obtained by the above-described method were mixed together in their respective amounts shown in Table 6 and melt-kneaded by LABO PLASTOMILL (same as described above) at 290° C. at 60 rpm for 5 minutes to obtain an intended polymer alloy.

Each of the thus obtained polymer alloys of Examples 18 to 20 and Comparative Examples 6 to 10 was fed into an injection molding machine (manufactured by The Japan Steel Works, Ltd. the trade name of "JS75", cylinder temperature: 330° C.) equipped with a mold for preparing a JIS test piece (mold temperature: 130° C.), and was then injection-molded to prepare various JIS test pieces. The notched IZOD impact strength of each of the polymer alloys was evaluated using a No. 1 test piece according to JIS K7110. The test results are shown in Table 6.

TABLE 6

|  | Ex. 18 | Ex. 19 | Ex. 20 | Comp. Ex. 6 | Comp. Ex. 7 | Comp. Ex. 8 | Comp. Ex. 9 | Comp. Ex. 10 |
| --- | --- | --- | --- | --- | --- | --- | --- | --- |
| PPS | 85 | 75 | 65 | 100 | 90 | 80 | 70 | 95 |
| Nanosheet-Shaped Layered Titanic Acid B | 5 | 5 | 5 | 0 | 0 | 0 | 0 | 5 |
| mEBR | 10 | 20 | 30 | 0 | 10 | 20 | 30 | 0 |
| IZOD (J/m) | 106 | 224 | 135 | 27 | 53 | 70 | 72 | 25 |

As can be seen from Table 6, in a case where an acid-modified polymer, mEBR is used as a polymer (B), addition of a compatibilizing agent according to the present invention increases the IZOD impact strength. An increase in IZOD impact strength indicates an improvement in mechanical strength.

Examples 21 and 22 and Comparative Examples 11 and 12

PA6, mEBR, and the nanosheet-shaped layered titanic acid C or D obtained by the above-described method were mixed together in their respective amounts shown in Table 7 and melt-kneaded by LABO PLASTOMILL (same as described above) at 290° C. at 60 rpm for 5 minutes to obtain an intended polymer alloy.

Each of the thus obtained polymer alloys of Examples 21 and 22 and Comparative Examples 11 and 12 was fed into an injection molding machine (manufactured by The Japan Steel Works, Ltd. the trade name of "JS75", cylinder temperature: 330° C.) equipped with a mold for preparing a JIS test piece (mold temperature: 130° C.), and was then injection-molded to prepare various JIS test pieces. The notched IZOD impact strength of each of the polymer alloys was evaluated using a No. 1 test piece according to JIS K7110. The test results are shown in Table 7.

TABLE 7

|  | Ex. 21 | Ex. 22 | Comp. Ex. 11 | Comp. Ex. 12 |
| --- | --- | --- | --- | --- |
| PA6 | 85 | 85 | 100 | 90 |
| Nanosheet-Shaped Layered Titanic Acid C | 5 | 0 | 0 | 0 |
| Nanosheet-Shaped Layered Titanic Acid D | 0 | 5 | 0 | 0 |
| mEBR | 10 | 10 | 0 | 10 |
| IZOD(J/m) | 108 | 114 | 40 | 79 |

As can be seen from Table 7, also in a case where an acid-modified polymer, mEBR is used as a polymer (B), PA6 is used as a polymer (A), and the nanosheet-shaped layered titanic acid C or D is used as a compatibilizing agent, the IZOD impact strength is increased, that is, mechanical strength is improved as in the cases described above.

Examples 23 to 25 and Comparative Example 13

PPS, PE, and the nanosheet-shaped layered titanic acid C obtained by the above-described method were mixed together in their respective amounts shown in Table 8 and melt-kneaded by LABO PLASTOMILL (which was the same as that described above) at 290° C. at 60 rpm for 5 minutes to obtain an intended polymer alloy.

Each of the thus obtained polymer alloys of Examples 23 to 25 and Comparative Example 13 was fed into an injection molding machine (manufactured by The Japan Steel Works, Ltd. the trade name of "JS75", cylinder temperature: 330° C.) equipped with a mold for preparing a JIS test piece (mold temperature: 130° C.), and was then injection-molded to obtain a molded product. The appearance of the molded product was observed to evaluate the presence or absence of peeling in the surface of the molded product. The evaluation results are shown in Table 8.

TABLE 8

|  | Ex. 23 | Ex. 24 | Ex. 25 | Comp. Ex. 13 |
|---|---|---|---|---|
| PPS | 50 | 50 | 50 | 53 |
| Nanosheet-Shaped Layered Titanic Acid C | 3 | 5 | 7 | 0 |
| PA66 | 47 | 45 | 43 | 47 |
| Size of Continuous Phase PPS (μm) | 4.5 | 5.2 | 7.0 | — |
| Size of Continuous Phase PA66 (μm) | 3.6 | 5.0 | 3.4 | — |
| Appearance | Good | Good | Good | Delamination was observed. |

As can be seen from Table 8, delamination was observed in the surface of the molded product of Comparative Example 13 containing no compatibilizing agent, but was not observed in the surfaces of the molded products of Examples 23 to 25 according to the present invention had good appearance without peeling on the surface.

FIGS. 8 and 9(a) to 9(c) show scanning electron micrographs of fractured surfaces of the molded products of Comparative Example 13, Example 23, Example 24, and Example 25, respectively.

In Examples 23 to 25 and Comparative Example 13, PPS as a polymer (A) and PA66 as a polymer (B) were mixed together at a weight ratio in the range of 40:60 to 60:40. Therefore, as shown in FIG. 9, in Examples 23 to 25 containing a compatibilizing agent had a co-continuous structure, that is, a structure in which both polymer phases are continuous. When, for example, a conductive filler is added to a polymer alloy having such a co-continuous structure, the conductive filler is oriented along the interface between continuous polymer phases and is therefore continuously oriented in a blended polymer. Therefore, it can be expected that a polymer alloy having a co-continuous structure can have good conductivity by adding only a small amount of conductive filler thereto.

As can be seen from the above Examples, a polymer alloy excellent in compatibility between polymers can be prepared by melt-kneading together at least one polymer (A) selected from the group consisting of polyphenylene sulfide, polyphenylene ether, and polyamide, a polymer (B) of a different type from the polymer (A), and the compatibilizing agent for polymer alloy according to the present invention.

In this case, such a polymer alloy may be prepared in such a manner that all the polymers to be blended and the compatibilizing agent for polymer alloy are mixed together and then the mixture is melt-kneaded or in such a manner that a master batch for polymer alloy is prepared by blending the compatibilizing agent for polymer alloy and at least one polymer (A) selected from the group consisting of polyphenylene sulfide, polyphenylene ether, and polyamide and then the master batch and a polymer (B) of a different type from the polymer (A) are melt-kneaded together.

In a case where the polymer (B) of a different type from the polymer (A) is an acid-modified polymer, a polymer alloy having improved impact resistance can be obtained.

In a case where at least one polymer (A) selected from the group consisting of polyphenylene sulfide, polyphenylene ether, and polyamide and a polymer (B) which is of a different type from the polymer (A) and which is selected from the group consisting of polyphenylene sulfide, polyphenylene ether, and polyamide are blended at a blending ratio in the range of 40:60 to 60:40, a polymer alloy having a co-continuous structure can be obtained.

What is claimed is:

1. A polymer alloy which is obtained by blending at least one polymer (A) selected from the group consisting of polyphenylene sulfide, polyphenylene ether, and polyamide, and a polymer (B) of a different type from the polymer (A) at such a blending ratio that an amount of the polymer (A) is the same as or larger than an amount of the polymer (B), with use of a compatibilizing agent for polymer alloy, said compatibilizing agent comprising nanosheet-shaped layered titanic acid having an organic basic compound intercalated between layers of the layered titanic acid.

2. The polymer alloy according to claim 1, wherein the layered titanic acid is obtained by treating a layered titanate with an acid or hot water.

3. The polymer alloy according to claim 2, wherein the layered titanate is represented by a general formula $A_xM_y B_zTi_{\{2-(Y+Z)\}}O_4$ wherein A and M represent monovalent to trivalent metals different from each other, B represents a defective portion of Ti, X is a positive real number and satisfies $0<X<1.0$, and Y and Z are each 0 or a positive real number and satisfy $0<Y+Z<1$.

4. The polymer alloy according to claim 2, wherein the layered titanate is represented by $K_{0.5 \text{ to } 0.8}Li_{0.27}Ti_{1.73}O_{3.85 \text{ to } 4}$.

5. The polymer alloy according to claim 1, wherein the polymer (B) is at least one selected from polyphenylene sulfide, polyphenylene ether, polyamide, polyester, polyolefin, polycarbonate, polystyrene, and thermoplastic elastomer.

6. The polymer alloy according to claim 1, wherein the polymer (B) is an acid-modified polymer.

7. The polymer alloy according to claim 1, wherein the compatibilizing agent for polymer alloy is contained in an amount of 0.1 to 30 wt %.

8. A master batch for use in preparing the polymer alloy according to claim 1, which is obtained by kneading the polymer (A) and the compatibilizing agent for polymer alloy.

9. A method for producing the polymer alloy according to claim 1, comprising the steps of obtaining a master batch by kneading the polymer (A) and the compatibilizing agent for polymer alloy, and blending the master batch and the polymer (B).

10. The polymer alloy according to claim 1, wherein the polymer alloy contains the nanosheet-shaped layered titanic acid as the only compatibilizing agent.

* * * * *